Patented Jan. 10, 1939

2,143,670

UNITED STATES PATENT OFFICE 2,143,670

SYNTHESIS OF BASE EXCHANGE MATERIALS

Claude B. Young, Columbus, Ohio

No Drawing. Application October 19, 1936,
Serial No. 106,383

8 Claims. (Cl. 23—112)

This invention relates to the synthesis of base exchange material and has for its principal object the provision of an improved process of synthesizing such material from starting materials which do not themselves possess base exchanging properties.

Base exchange materials, whether natural or synthetic, are characterized by a substantial content of (1) an amphoteric metallic oxide such as oxides of aluminum, iron, manganese or the like, (2) silica, (3) a basic oxide such as sodium or potassium oxide which is exchangeable by calcium and magnesium, and (4) water.

The most important natural base exchange material is greensand or glauconite, which is essentially a hydrated silicate of potassium and iron. When used as a water softener, the potassium content is exchanged for calcium. On regeneration with brine, the calcium is replaced by sodium and the greensand may be used again for water softening. While greensand has a rapid base exchange rate, it possesses several disadvantages. It needs to be stabilized to prevent undue disintegration and discoloration of the treated water. It has a relatively low base exchanging capacity, necessitating frequent regeneration and high consumption of washing water. Further, a bed of greensand incurs a high loss of pressure owing to the small size and round shape of the natural greensand.

The synthetic base exchange materials, that is, those which are synthesized from starting materials which have not in themselves base exchanging properties, heretofore produced, have been of two classes, fused materials and gels produced from the reaction of dilute solutions. The fused products are slow acting and of low softening capacity, and are no longer used practically. The gel products are manufactured from dilute solutions, which in the first instance give a gel consisting mainly of water. For example, the water content may be around 95% of the gel. For practical use the gel is dried to remove most of the water leaving, however, sufficient water to maintain hydration, which is an essential condition for base exchange materials. The hard dried gel is broken up and graded. Owing to the irregular shape of the particles of this material, the loss of pressure through a water softening bed is very low. These synthetic materials consist essentially of hydrated silicates of sodium and aluminum.

Other processes have been proposed in which materials, usually clay materials, having substantial base exchange properties are treated for the purpose of increasing the stability and the base exchange properties of the material. For the purpose of increasing the stability the material was baked at a high temperature resulting in substantially complete dehydration and disappearance of base exchange properties. Thereafter the material was subjected to subsequent treatment for rehydration and the regeneration of base exchange properties.

According to the present invention I have provided a process which gives a valuable and practicable synthetic base exchange material without the necessity of the high temperature for baking, and the use of regenerating solutions. The process is conducted under conditions which maintain during the process the degree of hydration necessary for the final product while avoiding any considerable excess of water. Stated briefly, the process comprises heating the essential starting materials which must include an oxide or compound of a metal having an amphoteric oxide, silica, an alkali and water under conditions which facilitate their interaction and prevent dehydration during the reaction. Preferably the water is introduced in combination with one or more of the other starting materials.

The metal having an amphoteric oxide is preferably aluminum, although iron, chromium, vanadium, manganese and other metals may be substituted if desired. The metal having an amphoteric oxide may be introduced as an oxide or other compound. Thus, I may employ bauxite or kaolin, which is also a source of supply of silica and water, to provide aluminum oxide, or limonite, native ferric hydroxide, or the like. Instead of kaolin I may employ other clays or clay-like substances. Kaolin is preferred on account of its purity and the ease of predetermining the relative oxide content of the final product. As a typical source of silica I may use the kaolin, or flint or quartz, both the latter being practically pure silica. As typical sources of alkali, I may use sodium silicate, which is also a source of silica, sodium hydroxide or other alkaline sodium compound. It will be understood that potassium compounds can be used equally well, but sodium compounds are preferred on account of their lower cost. The water which is necessary may be added as such at the time of mixing or during the reaction. It is convenient, in some cases, to employ as sources of the other materials, substances which contain water. For example, the water of hydration of the bauxite, kaolin or sodium silicate may form a constituent part of the synthesized base exchange material. I have found that with finely divided solid materials, in a state of thorough admixture, it is convenient to add sufficient water to provide a heavy but readily workable mud. This insures sufficient water for the hydration of the product and, in fact, provides a certain excess of water which is not objectionable. The water added should not be sufficient to produce a very thin slurry, since that might lead to separation of the solid materials.

The reaction between my starting compounds occurs at relatively low temperatures; that is, at temperatures below that at which any degree of fusion may occur. One result of avoidance of dehydration is that a very high capacity final product is obtained which is rapid in action when used for water softening. I have found that the reaction may very readily be effected by heating with steam under pressure. The reaction may be made to occur at 100 degrees C. by heating with steam at atmospheric pressure. I prefer, however, to use steam under pressure, for example, steam at pressures between 30 and 80 pounds, or higher, per square inch. The reaction may be conducted in a closed autoclave which may be exteriorly heated. I have found, however, that a very convenient way of performing the reaction is to pass saturated steam directly into the closed autoclave. Owing to the saturation of the steam, the material does not become dehydrated.

The invention will readily be understood from the following specific examples:

Example I

To prepare a base exchange material consisting of hydrated sodium aluminum silicate, for which the ratio of soda-alumina-silica is approximately 1:1:6, I take:

| | Pounds |
|---|---|
| Calcined kaolin | 300 |
| Sodium metasilicate | 290 |
| Ground silica | 253 |

The silica employed is finely ground quartz sand. The kaolin is preferably calcined before use to reduce its water content to less than 14%, which corresponds to the water of constitution of pure kaolin ($Al_2O.2SiO_2.2H_2O$). This calcination provides a starting material of definite moisture content and also has the advantage of insuring a finished product which forms to a much harder and stronger mass than does the product made from kaolin which is not calcined. The degree of calcination must be carefully controlled to prevent an excessive decrease in exchange capacity of the final product. I have found that a suitable degree of calcination gives a moisture content of around 9% or 10%. The calcination may be effected in a rotary furnace at a temperature of 1300 degrees F., although it can be effected in any other suitable way.

The dry mixture of calcined kaolin, sodium metasilicate ($Na_2O.SiO_2.5H_2O$) and ground silica above described is placed in a ball mill and ground for a period sufficient to insure very fine grinding and intimate mixing of the components. This may take several hours. After the mixture is thoroughly ground and mixed in the ball mill, it is transferred to another mixing vessel where the water is added. In the present instance I prefer to use about 0.18 pound of water per pound of dry mixture. This amount of water is somewhat in excess of the water necessary for hydration of the product, and yields a mud or plastic material convenient for handling. The water is preferably hot to facilitate solution of the sodium metasilicate. The wet mass is thoroughly mixed and is quickly transferred to shallow trays or other suitable containers in which it begins to set, eventually becoming quite hard. The reaction is exothermic. The set material is then finished by a suitable heat treatment in an autoclave or any other suitable type of pressure vessel. In the autoclave I prefer to provide a container of water in order to make sure that the material will not be dehydrated. The degree of temperature and the time of heating can be varied to a considerable extent. In the present example I have found that when heating with saturated steam at a pressure of about 30 pounds per square inch, a treatment of about four hours gives satisfactory results. The final product of the heat treatment has a consistency resembling that of brick. It may be broken up and graded according to size and is ready for immediate use. It has only a very slight alkaline reaction which indicates the completeness of the chemical reactions involved. The slight alkalinity may be removed by washing, if desired, although in most cases that is not necessary. After breaking up the material it is preferably screened to between 10 and 50 mesh for use and in this size it has a weight of about 50 pounds per cubic foot.

Example II

Another material has been made as follows:

| | Pounds |
|---|---|
| Calcined bauxite (residual moisture 16.6%) | 92 |
| Powdered silica | 288 |
| Sodium metasilicate | 214 |

These three ingredients were finely and intimately ground in a ball mill and then mixed in the maner previously described, with water to the extent of about 0.15 pound of water to each pound of dry mix. The plastic mass resulting from the mixing set to a firm mass on standing, and was then autoclaved for four hours with steam at 30 pounds per square inch gage pressure.

Example III

| | Pounds |
|---|---|
| Calcined kaolin | 444 |
| Ground silica | 480 |
| Caustic soda | 160 |

These materials were intimately mixed and pulverized in the dry state in a ball mill. Water to the extent of about 0.24 pound per pound of dry mixture was then incorporated and the resulting plastic material allowed to set. The material was heated directly by saturated steam at 30 pounds gage pressure for a period of four hours, giving a final porous product similar to brick in consistency.

Example IV

| | Pounds |
|---|---|
| Limonite (native ferric hydroxide) | 182 |
| Ground silica | 288 |
| Sodium silicate glass | 80 |

The sodium silicate glass had a composition approximating the formula $3.3SiO_2.Na_2O$. The material was processed as in Example III, the amount of water added being approximately 0.14 pound per pound of dry mix. The final product was generally similar to the products of the other examples, with the exception of color, which was reddish-brown.

Example V

| | Parts |
|---|---|
| Calcined kaolin (5.5% water) | 400 |
| Sodium metasilicate | 200 |

These materials were finely ground and intermixed and formed into a plastic mass with water to the extent of 0.17 lb. per pound of dry mixture. The material was treated as in the previous examples.

As will be readily understood from the foregoing examples, many modifications in procedure and in the choice of raw materials and their proportions, may be made within the scope of my invention. In these examples the ratio of amphoteric oxide to silica varies between approximately 1:2 to 1:8 and satisfactory products may be made with amphoteric oxide:silica ratios beyond this range.

The products obtained by my methods are hard, porous materials which may be broken up and graded and are ready for immediate use. They have a high base exchange capacity and are suitable for commercial use as water softening agents. They have a durability and stability comparing quite favorably with the best exchange materials heretofore available.

Having thus described my invention, I declare that what I claim as new and desire to secure by Letters Patent of the United States is:

1. The method of synthesizing base exchange material which consists in mixing an insoluble material including an amphoteric oxide with materials including alkali in soluble form and silica and water sufficient to form a mud, permitting the mud to set while retaining a substantial moisture content, and thereafter subjecting the set mass to heat, pressure and moisture conditions which effectively prevent dehydration of the product and convert the product into a hard friable solid mass.

2. The method of synthesizing base exchange material which consists in mixing an insoluble material including an amphoteric oxide with materials including sodium silicate and water sufficient to form a mud, permitting the mud to set while retaining a substantial moisture content, and thereafter subjecting the set mass to heat, pressure and moisture conditions which effectively prevent dehydration of the product and convert the product into a hard friable solid mass.

3. The method of synthesizing base exchange material which consists in mixing an insoluble material including an amphoteric oxide with materials including alkali in soluble form and finely divided free silica and water sufficient to form a mud, permitting the mud to set while retaining a substantial moisture content, and thereafter subjecting the set mass to heat, pressure and moisture conditions which effectively prevent dehydration of the product and convert the product into a hard friable solid mass.

4. The method of synthesizing base exchange material which consists in mixing an insoluble material including a clay with materials including alkali in soluble form and silica and water sufficient to form a mud, permitting the mud to set while retaining a substantial moisture content, and thereafter subjecting the set mass to heat, pressure and moisture conditions which effectively prevent dehydration of the product and convert the product into a hard friable solid mass.

5. The method of synthesizing base exchange material which consists in mixing an insoluble material including a clay with materials including sodium silicate and water sufficient to form a mud, permitting the mud to set while retaining a substantial moisture content, and thereafter subjecting the set mass to heat, pressure and moisture conditions which effectively prevent dehydration of the product and convert the product into a hard friable solid mass.

6. The method of synthesizing base exchange material which consists in mixing an insoluble material including a clay with materials including alkali in soluble form and finely divided free silica and water sufficient to form a mud, permitting the mud to set while retaining a substantial moisture content, and thereafter subjecting the set mass to heat, pressure and moisture conditions which effectively prevent dehydration of the product and convert the product into a hard friable solid mass.

7. The method of synthesizing base exchange material which consists in mixing kaolin, sodium silicate and finely divided free silica and water sufficient to form a mud, permitting the mud to set while retaining a substantial moisture content, and thereafter subjecting the set mass to heat, pressure and moisture conditions which effectively prevent dehydration of the product and convert the product into a hard friable solid mass.

8. The method of synthesizing base exchange material which consists in mixing an amphoteric oxide, sodium silicate and finely divided free silica and water sufficient to form a mud, permitting the mud to set while retaining a substantial moisture content, and thereafter subjecting the set mass to heat, pressure and moisture conditions which effectively prevent dehydration of the product and convert the product into a hard friable solid mass.

CLAUDE B. YOUNG.